United States Patent [19]

Sewell et al.

[11] Patent Number: 4,694,695
[45] Date of Patent: Sep. 22, 1987

[54] SEWER PIPE SMOKE BLOCKING DEVICE

[76] Inventors: Rickey E. Sewell, 1100 Hilltop Rd.; Glenwood H. Sewell, 1259 N. Buckner, Apt. 103, both of Derby, Kans. 67037

[21] Appl. No.: 911,076

[22] Filed: Sep. 24, 1986

[51] Int. Cl.4 ............................................. G01M 3/28
[52] U.S. Cl. .................................. 73/40.5 R; 73/40.7; 138/93
[58] Field of Search .................. 73/40.5 R, 40.7, 49.8; 138/93

[56] References Cited

U.S. PATENT DOCUMENTS 4,195,520 4/1980 Shaver ......................... 73/40.5 R X

FOREIGN PATENT DOCUMENTS 567680 1/1933 Fed. Rep. of Germany ... 73/40.5 R

Primary Examiner—Stewart J. Levy
Assistant Examiner—Joseph W. Roskos
Attorney, Agent, or Firm—Bill D. McCarthy

[57] ABSTRACT

A sewer pipe smoke blocking device for inserting into a sewer pipe to prevent smoke introduced into the pipe from leaking therepast, having a hollow cylindrical housing adapted for receipt into the sewer pipe. An inflatable bladder surrounds the outer circumference of the housing and a gate assembly is mounted at one end of the housing to selectively close the hollow of the housing to just below the level of sewer water flowing therethrough.

9 Claims, 7 Drawing Figures

SEWER PIPE SMOKE BLOCKING DEVICE

BACKGROUND OF THE INVENTION

This invention relates to the smoke blocking device and more particularly, but not by way of limitation, to a smoke blocking device used in sewer pipe when checking for leaks by introducing smoke in the pipe.

Heretofore, it has been a common practice when introducing smoke in a sewer pipe to use sandbags to block the pipe both upstream and downstream and to introduce smoke in the pipe to see if there are any leaks in the pipe by following the escape of the smoke from the pipe. This method of checking for pipe leaks subjects a worker to being lowered into a manhole and the possibilities of being exposed to deadly sewer pipe gas.

In U.S. Pat. No. 3,451,259 to McNulty, U.S. Pat. No. 3,453,869 to Cherne, U.S. Pat. No. 3,862,607 to Watts and U.S. Pat. No. 3,958,607 to Gray, different types of telephone cable assemblies, apparatus for sealing pipe leaks, apparatus for testing conduit and plugs for pipe lines are disclosed. None of the prior art patents addresses the problem of blocking smoke in a sewer pipe and eliminating the need of workers being subjected to deadly sewer gas.

SUMMARY OF THE INVENTION

The sewer pipe smoke blocking device eliminates the need of lowering workers into manholes when working on sewer pipe and preventing the workers from being exposed to deadly sewer gas.

The smoke blocking device is simple in construction, readily adaptable for different diameters of sewer pipe and can be easily installed by lowering the device into a manhole and inserting it upstream into the sewer pipe.

The smoke blocking device prevents smoke from leaking past the device when the smoke is introduced upstream and allows sewer water to pass therethrough when checking for leaks using the smoke.

The sewer pipe smoke blocking device has a hollow cylindrical housing with a diameter less than the diameter of the sewer pipe which is adapted for receipt in the sewer pipe. An inflatable bladder surrounds the outer circumference of the housing. When the bladder is inflated, the housing is secured inside a portion of the sewer pipe. A gate assembly is mounted at one end of the housing. When lowered, the gate assembly engages the top of the sewer water to prevent smoke from passing through the cylindrical housing.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
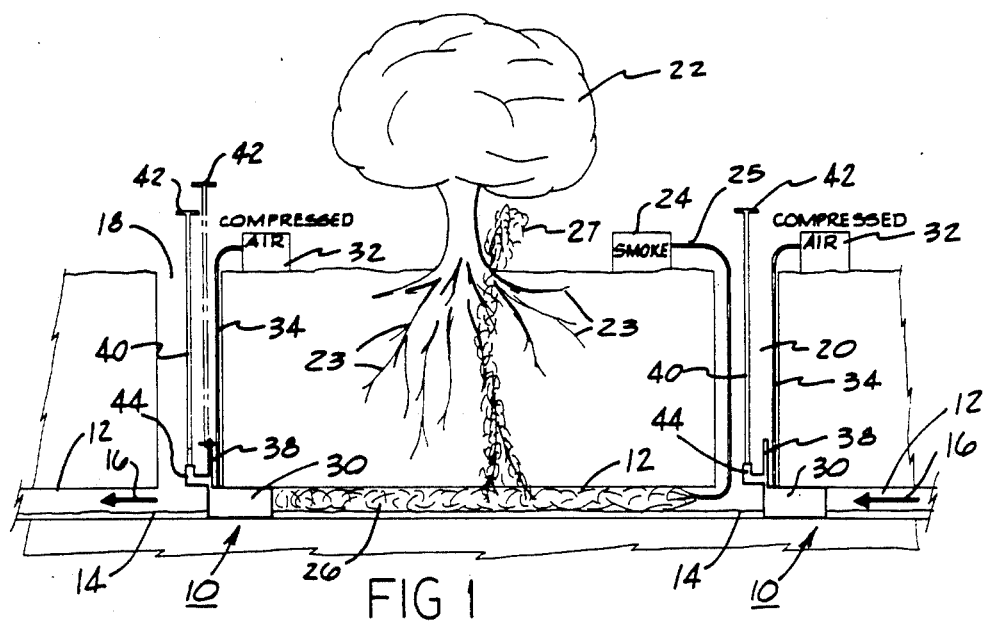
FIG. 1 illustrates a cut-away view of two manholes and a sewer line using two of the subject sewer pipe smoke blocking devices.

In FIG. 1 the sewer pipe smoke blocking device is designated by general reference 10. The smoke blocking device 10 is inserted into a portion of a sewer pipe 12 having sewer water 14 flowing therethrough with the flow indicated by arrows 16. In this view, a pair of manholes are shown with a first manhole 18 downstream from a second manhole 20. Between the two manholes 18 and 20 a tree 22 is shown with roots 23 extending downwardly and engaging and causing a leak in the sewer pipe 12. In this example, the smoke blocking device 10 is shown with one upstream from the tree 22 in the manhole 20 with a second device 10 inserted in the manhole 18. Using smoke producing equipment 24 with an elongated tube 25, smoke 26 is introduced upstream in the sewer pipe 12 to determine if there are any leaks from the roots 23 of the tree 22. As shown in FIG. 1, smoke 27 is detected escaping to the atmosphere near the base of the tree 22 and therefore, it will be necessary to repair the pipe 12 between the manholes 18 and 20.

In order to make sure that the smoke 26 is contained between the manholes 18 and 20, an inflatable bladder 28 (shown in greater detail in FIG. 4) surrounds the circumference of a hollow cylindrical housing 30 of the device 10. The bladder 28 of each of the smoke blocking devices 10 is inflated using compressed air 32 as shown in FIG. 1 which is connected to an air pressure line 34 which is in turn attached to an air valve 36 shown in FIG. 4. By inflating the bladder 28, the smoke blocking device 10 is securely held inside the sewer pipe 12 and seals the sewer pipe about its internal wall.

Smoke is prevented from passing through the hollow housing 30 through the use of a gate assembly 38 having a plurality of individual gates which will be discussed under FIG. 4. By lowering the gates to extend just below the level of the sewer water 14, smoke is prevented from escaping through the hollow cylindrical housing 30. In FIG. 1 an elongated member or pipe 40 is shown having a handle end 42 with the other end thereof connectable to a swivel 44 which is pivotally attached to the gate assembly 38 via its clevis end 44A and headed pin 44B attached to a tab 44C. The pin 44B is removable and is secured in the assembled position shown via a retaining clip 44D. As indicated hereinbelow, the handle member 40 is removable from the swivel 44, leaving the swivel 44 free to pivot downwardly; to assure that the swivel 44 remains in a predetermined position once the pipe 40 is removed, a set screw 44E (FIG. 2) is supported on a beveled end of the tab 44C. With the pin B and the swivel 44 removed from the tab 44C, the set screw 44E can be adjusted to extend from the tab a selected distance whereby the angular rotation of the swivel 44 on the pin 44B is restricted to a predetermined angular position. This feature assures that the swivel 44 will remain in a desired angular disposition so that the handle member 40 can be reconnected to the swivel 44 by manipulation of the handle end 42 from ground level.

Prior to introducing the smoke 26 into the sewer pipe 12, each of the smoke blocking devices 10 is lowered into the manholes 18 and 20 using the elongated handle member 40 which is connected to the swivel 44; preferrably, for safety purpose, a rope (not shown) is also tied to each of the smoke blocking devices 10, and an eyelet connector 45 is provided as a convenient rope connecting point. The smoke blocking devices 10 are received in divided portions of the sewer pipe 12 at the bottom of the manholes with the housing 30 of each inserted upstream into the sewer pipe 12. It should be noted that not all of the housing 30 is received into the sewer pipe 12, as the gate assembly 38 remains in a portion of the sewer pipe 12 at the bottom of the manholes 18 and 20 as shown. The elongated handle member 40 is then removed from the swivel 44, and it is then used, in the manner described below, to push the gate assembly 38 so as to lower it to just below the level of the sewer water 14. By lowering a flashlight into the manholes 18 and 20, the proper adjustment of the gate level 38 can be observed. Smoke is then introduced upstream into the sewer pipe 12 between the two smoke blocking devices 10 and the smoke 26 is prevented from leaking past the smoke blocking devices 10 so any leak in the pipe will manifest itself in the manner described above for FIG. 1.

Figure 2:
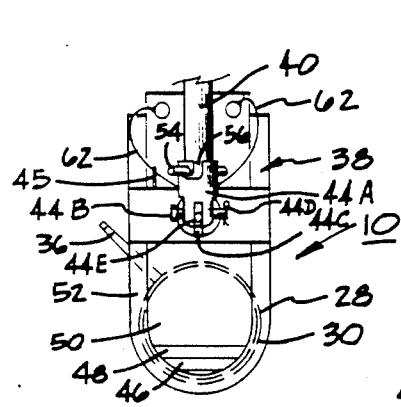
FIG. 2 is a front elevational view of the smoke blocking device.
Figure 3:
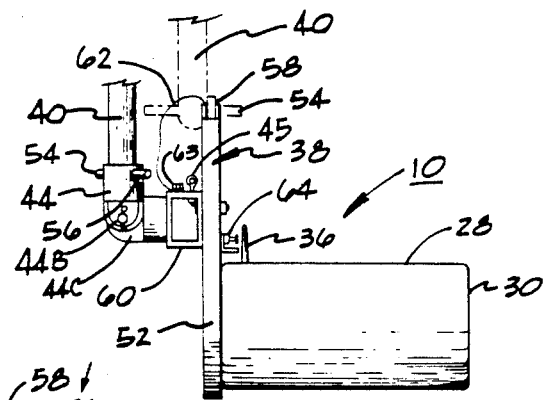
FIG. 3 is a side elevational view of the smoke blocking device.

In FIGS. 2 and 3 front and side views of the smoke blocking device 10 are shown. In FIG. 2 the gate assembly 38 can be seen having a first gate 46, a second gate 48 and a third gate 50 which are slidably received in spaced apart grooves in a "U" shaped gate housing 52 making up the overall gate assembly 38. It should be noted that the three gates 46, 48 and 50 are slidingly linked together and each has a flat horizontal bottom so that when they engage the level of the sewer water, any particles in the water can flow therepast by dipping underneath the flat bottom surface of the gate. Also by using three of the gates linked together; the first gate 46 having a smaller width bottom surface than the other two gates can be lowered to the bottom of the housing in the event that there is no sewer water encountered in the bottom of the sewer pipe. When the first gate 46 is raised, the second gate 48 is used typically blocking ¾ of the diameter hollow housing 30 with the third gate 50 blocking approximately half the diameter or less of the housing 30. More details of the gates 46, 48 and 50 are provided herein below with regard to FIGS. 5 through 6.

In FIG. 2, the lower end of the handle member 40 is shown with a connecting pin 54 slidably received in a quick release locking groove 56 in the swivel 44. By placing the pin 54 in the groove 56 and turning the handle member 40 in a clockwise manner, via the handle emd 42, the lower end of the handle member 40 is locked to the device 10 for lowering the device into the manhole and inserting the hollow housing 30 into the sewer pipe 12. When this has been completed, the handle member 40 is rotated in a counter clockwise direction, releasing the pin 54 from the groove 56. The pin 54 is then inserted into a hole 58 in the top of the gate assembly 38 for lowering the gates 46, 48 and 50.

In FIG. 3, the lower end of the handle member 40 with pin 54 is shown in dash lines engaging the hole 58 for lowering the gate assembly 38. Also shown in FIG. 3 is the swivel 44 attached to an angular brace 60 for securing the swivel 44 to the side of the gate assembly 38. Also shown in this view is one of a pair of wire cables 62 attached to bracket 60 (via a hand tightened bolt 63) and to the top of the gate assembly 38 to prevent the pipe 40 from inadvertently removing the gates 46, 48 and 50 from the "U"-shaped housing 52.

Figure 4:
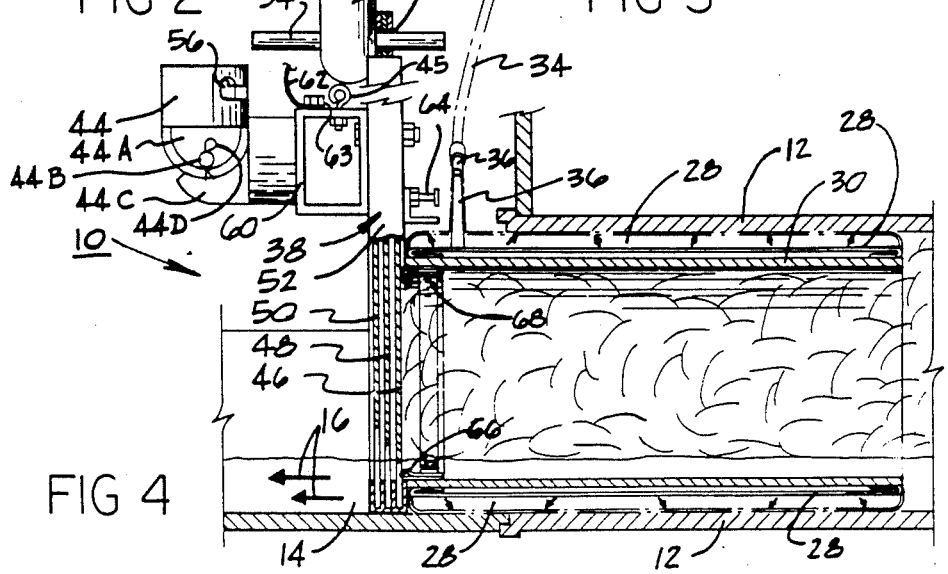
FIG. 4 is a partial cut-away side elevational view of the smoke blocking device inserted upstream into a portion of the sewer pipe.

In FIG. 4 an enlarged side sectional view of the smoke blocking device 10 is shown. In this view, compressed air has been applied through the air line 34 connected to the valve 36 for inflating the inflatable bladder 28 so the bladder 28 is expanded against the inner circumference of the sewer pipe 12 for holding the housing 30 securely inside the sewer pipe 12. Also shown in this view is the sewer water 14 flowing through the housing 30 and under the first gate 46 lowered to just below the water level of the sewer water 14 to prevent smoke 26 from passing downstream through the smoke blocking device 10. The bladder 28 is shown in solid lines and in dotted lines when inflated. Also shown in this view is the pipe 40 removed from the swivel 44 with the connecting pin 54 inserted in the hole 58 in the top of the gate assembly 38 for lowering the three gates in the gate assembly. Also mounted on the side of the gate assembly 30 is a threaded compression screw 64 (and lock nut) which is used by threading inwardly and compressing the three gates together to prevent the gates from slipping downward when they are properly adjusted with the bottom edge of one of the gates below the sewer water level. An "0"-ring 66 is disposed around the inner circumference of the housing 30 and adjacent the first gate 46 to insure there is no smoke leakage around the gates. The "0"-ring is secured in place via a retaining ring 68 which is attached to the inner wall of the housing 30 such as by a plurality of metal screws.

Figures 5, 5A:
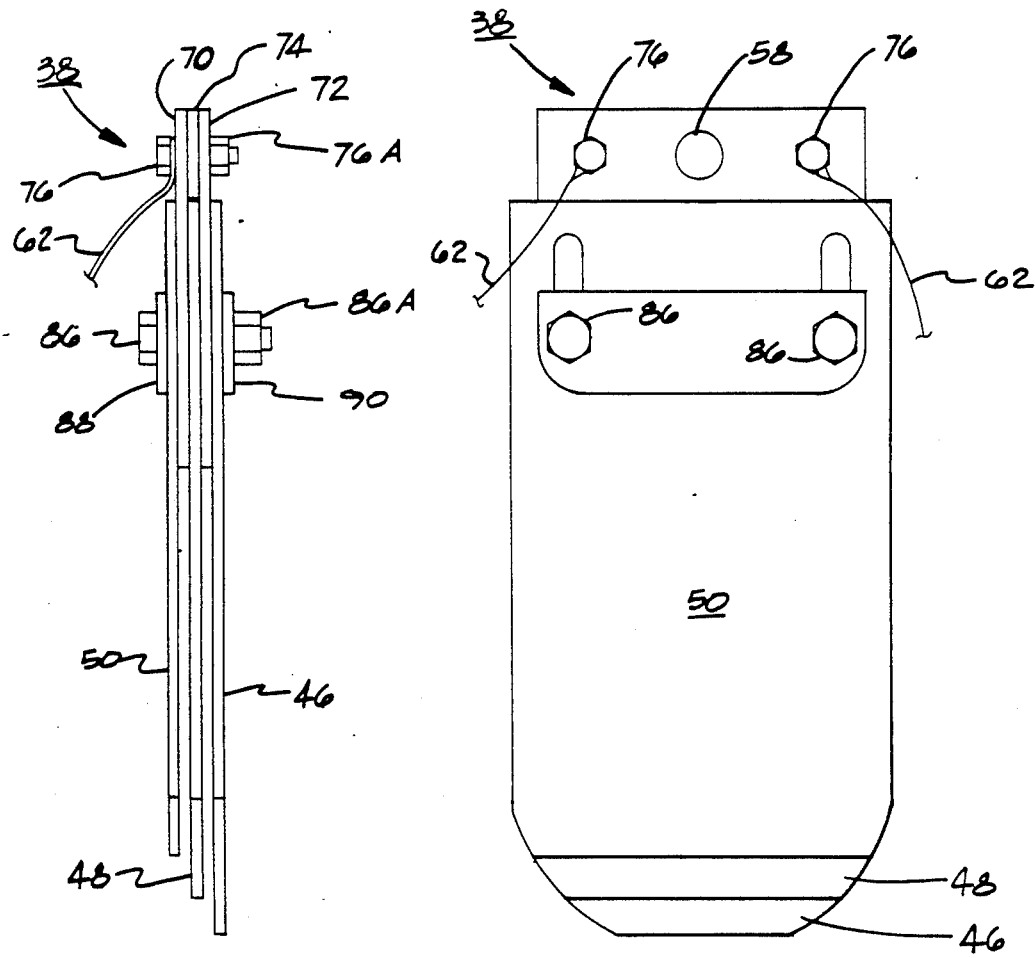
FIG. 5 is a side elevational view of the sliable gate members of the smoke blocking device.
FIG. 5A is a front elevational view thereof.

Shown in FIGS. 5 and 5A is part of the gate assembly 38, with the assembly of its slidable first gate 46, second gate 48 and third gate 50 removed from the "U"n-shaped gate housing 52 for the purpose of description. The gates 46, 48 and 50 are planar members assembled in spaced sandwich disposition via a pair of upwardly extending tab members 70 and 72. A spacer member 74 is disposed between the tab members 70 and 72, and a pair of bolts 76 pass through appropriately placed apertures and tightened with their respective lock nuts 76A.

Figure 6:
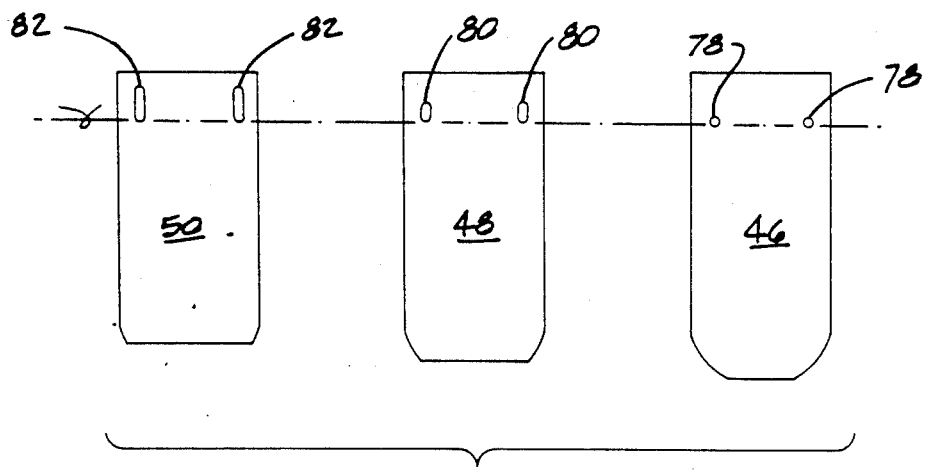
FIG. 6 is a front elevational view of the individual gate member in side by side disposition to show the relative lengths and hole configurations thereof.

As shown in FIG. 6, each of the gates 46, 48 and 50 has a pair of apertures therethrough, as follows: first gate 46 has a pair of circular apertures 78; second gate 48 has a pair of elongated apertures or slots 80; and third gate 50 has a pair of elongated slots 82. The bottoms of the apertures 78, 80 and 82 align along a reference line 84, and as noted, the slots 82 in third gate 50 are longer than the slots 80 (in second gate 48).

When assembled as shown in FIGS. 5 and 5A, a pair of bolts 86 extend through the aligned apertures 78, 80 and 82 with a pair of apertured spacer plates 88 and 90 disposed on opposing sides thereof. A lock nut 86A is secured to the bolts 86 so that some sliding slack is afforded the sandwiched assembly of gates 46, 48 and 50 and tab members 70, 72. The above mentioned hole 58 (shown in FIG. 5A) extends through the tightly secured together tab members 70, 72 and spacer member 74.

With the gates of the gate assembly 38 disposed in the "U"-shaped housing 52 as depicted in FIG. 4, placement of one of the pins 54 of the handle member 40 in the hole 58 permits manipulation of all three of the gates 46, 48 and 50 downwardly as the bolts 86 push against the bottoms of the apertures 78, 80 and 82 therein. The lower edges of each of the gates is shaped as necessary to configure to the grooves of the "U"-shaped housing 52, with each having a flat horizontal bottom for the reason stated hereinabove. This assures that the horizontal edge of the lowest gate is always provided for contact with the level of the sewer water. Once pushed to the bottom of the grooved "U"-shaped housing 52, the relative freedom of the three gates 46, 48 and 50 to slide independently on the bolts 86 for the limited difference in linear dimensions of the apertures 78, 80 and 82 provides the capability of imparting sequential raising of these gates. That is, the gates 46, 48 and 50 can be raised individually with the upward pull provided by the pin 54 (on pole 40) in the hole 58 as follows: the first gate 46 will be raised alone until the bolts 86 engage the tops of slots 80 in the second gate 80; at this time, further upward movement of the pin 56 in hole 58 will raise the first and second gates 46, 48 until meeting the bolts 86 in third gate 50, at which time further upward movement will lift all three gates.

From reviewing the above-mentioned drawings, it will be clear that the subject sewer pipe smoke blocking device 10 is readily adaptable for different types of sewer pipes to prevent smoke introduced in the pipe from passing through the smoke blocking device yet allowing sewer water to flow therethrough and prevent back up of the sewer water in the pipe. It will be understood that, once activated in place, the smoke blocking devices 10 are readily removable from the sewer pipe 12 by relieving the air pressure on the bladder 28 and reversing the lowering steps discussed above, there eliminating the necessity of workers being lowered into manholes to check sewer pipe leaks and running the great risk of being exposed to deadly sewer gas.

Changes can be made in the construction and arrangement of the parts or elements of the embodiments as described herein without departing from the spirit or scope of the invention defined in the following claims.

What is claimed is:

1. A sewer pipe smoke blocking device for lowering into a manhole and inserting in a sewer pipe, the device preventing smoke introduced upstream in the pipe from passing therepast while allowing sewer water to pass therethrough, the device comprising:
   a hollow cylindrical housing having a diameter less than the diameter of the sewer pipe and adapted for receipt therein;
   an inflatable bladder surrounding the outer circumference of the housing, the bladder when inflated securing the housing to the inner circumference of the sewer pipe; and
   a gate assembly mounted on the housing, the assembly when lowered, engaging the top of the sewer water flowing through the hollow housing.

2. The device as described in claim 1 wherein the gate assembly is mounted at one end of the housing and includes more than one individual vertically mounted gates having a horizontal bottom for engaging the top of the flat surface of the sewer water.

3. The device as described in claim 2 further including a hollow swivel pivotally connected to the gate assembly.

4. The device as described in claim 3 further including an elongated handle member having a handle end and having a pin extensive from the other end, the pin adapted for releasable engagement with the swivel for lowering the device into the manhole and inserting the housing into the sewer pipe.

5. The device as described in claim 4 further including a threaded compression screw mounted in the gate assembly for engaging the sides of the gate for compressing the gates together to prevent the gates from slipping downward when raised and lowered in the gate assembly.

6. A sewer pipe smoke blocking device for lowering into a manhole and inserting in a sewer pipe, the device preventing smoke introduced in the pipe from passing therepast while allowing sewer water to pass therethrough, the device comprising:
   a hollow cylindrical housing having a diameter less than the diameter of the sewer pipe and adapted for receipt therein;
   an inflatabe bladder surrounding the outer circumference of the housing, the bladder when inflated securing the housing to the inner circumference of the sewer pipe; and
   a gate assembly attached to one end of the housing and having a plurality of individual gates mounted in a gate housing, the gates, when lowered engaging the top of the sewer water flowing through the hollow housing.

7. The device as described in claim 6 wherein the individual gates each have a flat horizontal bottom for engaging the flat surface of the sewer water.

8. The device as described in claim 6 further including a hollow swivel attached to the gate assembly and adapted for receiving one end of an elongated handle member, the handle member used for lowering the device into the manhole and inserting the housing into the sewer pipe.

9. The device as described in claim 8 wherein the handle member further includes a pin extensive from one end, for receipt in a locking groove in the swivel for releasable engagement of the handle member with the swivel, the pin also used for engaging a hole in the top of the gate assembly for lowering the individual gates below the water level of the sewer water.

* * * * *